(12) United States Patent
Callahan

(10) Patent No.: US 6,546,921 B1
(45) Date of Patent: Apr. 15, 2003

(54) HEATED PCV VALVE

(75) Inventor: Douglas J. Callahan, Rochester Hills, MI (US)

(73) Assignee: Miniature Precision Components, Walworth, WI (US)

(*) Notice: Subject to any disclaimer, the term of this patent is extended or adjusted under 35 U.S.C. 154(b) by 0 days.

(21) Appl. No.: 10/135,467

(22) Filed: Apr. 30, 2002

(51) Int. Cl.[7] .............................................. F02M 25/06
(52) U.S. Cl. ...................................... 123/573; 123/574
(58) Field of Search ................................ 123/572, 573, 123/574, 41.86

(56) References Cited

U.S. PATENT DOCUMENTS

| | | | |
|---|---|---|---|
| 4,068,628 A | * 1/1978 | Duckworth | 123/58.8 |
| 4,517,951 A | * 5/1985 | Otaka et al. | 123/572 |
| 5,878,731 A | * 3/1999 | Bedkowshi | 123/573 |
| 6,044,829 A | * 4/2000 | Butz et al. | 123/573 |
| 6,412,479 B1 | * 7/2002 | Canfield et al. | 123/573 |

* cited by examiner

Primary Examiner—Marguerite McMahon
(74) Attorney, Agent, or Firm—Artz & Artz, P.C.

(57) ABSTRACT

A heated PCV valve (30) includes a valve body (80) for metering a flow of crankcase gases therethrough. The valve body (80) has an intermediate portion (82) with a heating element (50) integrally disposed therein for heating the crankcase gases.

20 Claims, 2 Drawing Sheets

HEATED PCV VALVE

TECHNICAL FIELD

The present invention relates generally to positive crankcase ventilation systems (PCV systems) for internal combustion engines (IC engines), and more particularly to a heated valve for allowing the proper operation of a PCV system in cold environments, e.g. where the temperature is approximately −40 C.

BACKGROUND OF THE INVENTION

Positive crankcase ventilation systems (PCV systems) are known for removing crankcase gases from internal combustion engines (IC engines) and controlling emissions therefrom. Crankcase gases include blowby gases, which are small amounts of fumes and unburned fuel-air mixtures that bypass the pistons and the piston rings during operation of the IC engine.

PCV systems typically route crankcase gases from the crankcase to the intake manifold. The crankcase gases are then combined with the fuel-air mixture and drawn back into the cylinders for combustion. The resulting fumes are ultimately carried to a catalytic converter where they are treated for release into the atmosphere.

A typical PCV system uses a positive crankcase ventilation valve (PCV valve) to meter the flow of crankcase gases from the crankcase to the intake manifold. The PCV valve has an orifice through which the crankcase gases flow. The orifice may be formed within a washer that is insert molded into the body of the PCV valve or otherwise provided by other suitable means.

Also, the valve ordinarily uses a plunger to obstruct the flow of crankcase gases through the orifice of the valve. A common design for the PCV valve requires that the plunger is oriented in a manner that manifold vacuum draws the plunger toward the orifice of the valve. The plunger usually has a spring or other biasing member coupled thereto for forcing the plunger away from the orifice. The force of the spring is balanced with manifold vacuum to determine the degree to which the plunger obstructs the flow of crankcase gases. This balance regulates the flow of crankcase gases through the PCV valve so as to remove crankcase gases from the crankcase at the same rate they accumulate therein.

In particular, crankcase gases typically accumulate within the crankcase at a rate in direct relation to engine speed. For example, the accumulation rate is minimal at engine idle and increases during higher engine speeds.

Moreover, the engine speed is typically inversely proportional to manifold vacuum. Manifold vacuum is high at engine idle and decreases at higher engine speeds. A high manifold vacuum may overcome the force of the spring and draw the plunger sufficiently toward the orifice to decrease the flow of gases exiting the crankcase. Alternatively, a lower manifold vacuum may be overpowered by the force of the spring in that the plunger is not drawn as close to the orifice. Thus, crankcase gases are removed from the crankcase at a similar rate as they accumulate therein.

In addition to removing crankcase gases, an open-type PCV system also supplies fresh air to the crankcase. The fresh air is normally drawn from an air intake through a PCV closure tube into the crankcase. Since the incoming air typically has moisture, water may build up within the crankcase.

Unfortunately, the presence of water within the crankcase may cause existing PCV systems to fail in cold environments, e.g. environments where the temperature is −40 C or below. Moisture in the crankcase may mix with blowby gases and then flow through the PCV valve into the intake manifold. As the gases mix with the cold air in the intake manifold, ice may form and block the PCV valve. Meanwhile, blowby gases may continue to enter the crankcase thereby causing positive pressure to build within the crankcase.

The positive pressure can cause an adverse effect known as backflow. Backflow is the condition where flow in the PCV closure tube is reversed. The positive pressure causes crankcase gases within the crankcase to flow through the PCV closure tube into the air intake. Moisture in the crankcase gases may freeze within the air intake as a result of the low temperature of the fresh air and the substantial drop in pressure of the gases as they enter the air intake. A block of ice may subsequently break free and be drawn into the throttle body where it wedges the throttle plate into an open position. Obviously, such an adverse result may cause serious safety problems.

Another problem associated with the build up of positive pressure within the crankcase is that it may cause an engine seal to fail. The compromised seal would then allow motor oil to escape from the engine consequently leading to loss of engine function.

Furthermore, the failure of the engine seal may allow blowby gases to escape into the atmosphere without first having been burned in the engine or treated by the catalytic converter. These blowby gases typically contain hydrocarbon and carbon monoxide vapors which are known to be poisonous to the environment. Consequently, the release of these gases is an undesirable result.

Still another problem resulting from a PCV valve blocked by ice is that crankcase gases may contaminate the motor oil. Low levels of contamination may reduce the life of the oil, whereas higher levels may lead to engine failure. In this regard, sufficient contamination may transform the oil into a heavy sludge thereby depriving the engine of needed oil. As a result, parts of the engine are left unprotected and may subsequently lead to bearing failure. In addition, these parts may also corrode to the extent of causing engine failure.

One proposed solution requires the integration of a heating device within a discharge port of the manifold. The heating device is typically integrated within an end portion of the port and extends radially outward therefrom. The heating device communicates directly with a mixture of the fresh air and the crankcase gases.

The discharge port and the heating device may fail to provide any heat to the crankcase gases as they flow from the crankcase to the manifold. Moisture in the crankcase gases may condense and ice may form as the crankcase gases travel from the crankcase to the discharge port. In this regard, the ice may impede or even completely block the flow of crankcase gases to the intake manifold. As a result, the PCV system may no longer operate properly and the various problems described above may arise.

Therefore, it would be desirable to provide a PCV valve that heats the flow of crankcase gases and allows a PCV system to operate in cold environments.

SUMMARY OF THE INVENTION

The present invention reduces the adverse effects of crankcase gases within IC engines and decreases environmental pollution in cold environments as low as −40 C. In carrying out the present invention, a heated PCV valve is integrated within a PCV system of an IC engine to properly heat the flow of crankcase gases drawn into the intake manifold.

The heated PCV valve includes a valve body for metering a flow of crankcase gases therethrough. The valve body has an intermediate portion with a heating element integrally disposed therein for heating the crankcase gases that flow through the valve.

One advantage of the present invention is that the PCV system functions properly despite an environment that is sufficiently cold that moisture within the engine may freeze and block the flow of crankcase gases.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DESCRIPTION OF THE PREFERRED EMBODIMENT

Figure 1:
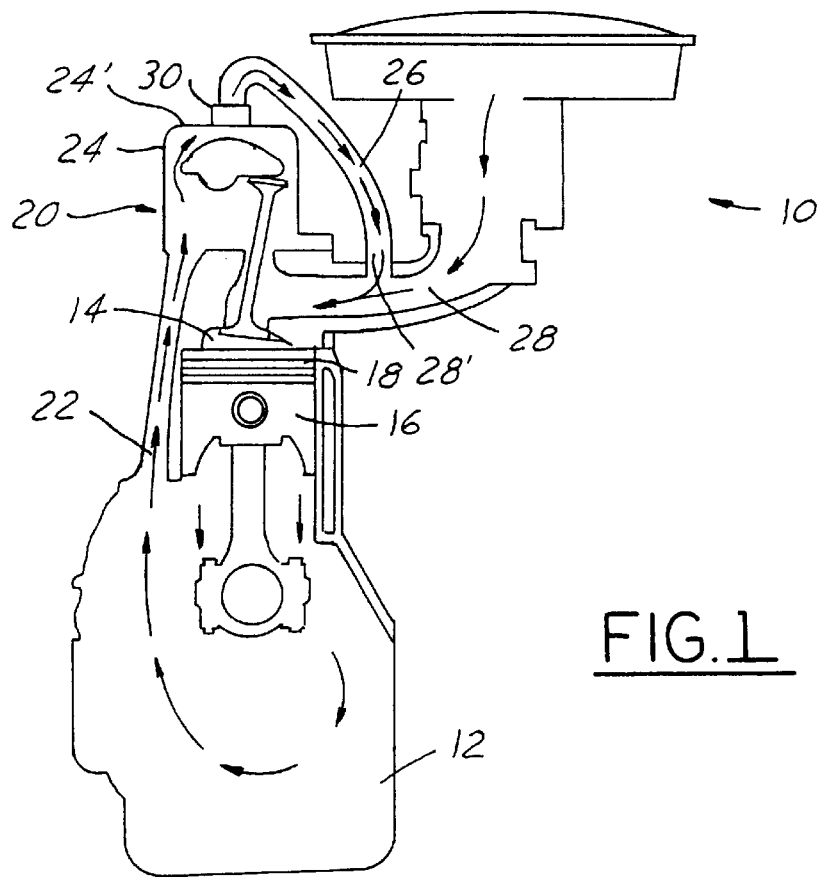
FIG. 1 is a diagrammatic representation of a PCV system within an internal combustion engine according to a preferred embodiment of the invention.

In the following figures, the same reference numerals are used to identify the same components in the various views.

Referring to FIG. 1, there is generally shown a diagrammatic representation of a positive crankcase ventilation system 20 (PCV system) within an internal combustion engine 10 (IC engine) according to a preferred embodiment of the present invention. The PCV system 20 routes crankcase gases from a crankcase 12 to a combustion chamber 14 where they are burned. Thereafter, the fumes are preferably carried to a catalytic converter (not shown) where they are treated for release into the atmosphere.

As a person skilled in the art will understand, crankcase gases include blowby gases, which are the fumes and unburned fuel-air mixtures that bypass a piston 16 and a piston ring 18 during operation of an engine 10. The PCV system 20 includes a first conduit 22 for permitting the crankcase gases to travel from the crankcase 12 to a cylinder head cover chamber 24. The first conduit 22 may be a hose or any other suitable passageway for transferring the crankcase gases.

The cylinder head cover chamber 24 is defined by a cam cover 24'. The cam cover 24' has a heated PCV valve 30 integrated therein for regulating flow of crankcase gases out of the cylinder head chamber 24.

The heated PCV valve 30 is preferably controlled in a manner that allows flow of crankcase gases therethrough at approximately the same rate as crankcase gases flow into the crankcase 12. The valve 30 may be regulated accordingly by using manifold vacuum induced by engine speed. In general, a high vacuum causes the PCV valve 30 to restrict the flow of gases therethrough, whereas a lower vacuum permits a higher flow therethrough. Further, a high manifold vacuum is induced by low engine speeds, such as engine idle, whereas a lower manifold vacuum is created by higher engine speeds. Consequently, the flow of crankcase gases is restricted at lower engine speeds when less crankcase gases are created. In contrast, the flow of crankcase gases becomes less restricted at higher engine speeds when more crankcase gases are created.

After passing through the heated PCV valve 30 from the cylinder head chamber 24, the crankcase gases preferably flow through a second conduit 26 to an intake manifold 28. The second conduit 26 may be a hose or any other suitable passageway for transferring the crankcase gases. Moreover, the second conduit 26 is operatively coupled to an intake port 28' of the manifold 28. In a preferred embodiment, the intake port 28' is merely an opening without any valve mechanisms therein for regulating the flow of crankcase gases.

In the intake manifold 28, the crankcase gases mix with the fuel-air mixture. The resulting mixture is then drawn into the combustion chamber 14 of the engine where it is burned. Thereafter, the fumes are preferably carried to a catalytic converter for proper treatment before releasing them into the atmosphere.

In an alternative embodiment, the PCV valve 30 may be integrated within the crankcase 12 such that crankcase gases flow directly from the crankcase 12 through the PCV valve 30 into a throttle body (not shown). The crankcase gases may then flow into the combustion chamber 14 of the engine 10 where they are burned and ultimately carried to the catalytic converter.

Although two examples of PCV systems 20 are described above, it is obvious to a person skilled in the art that a variety of other PCV systems 20 may be employed.

Figure 2A:
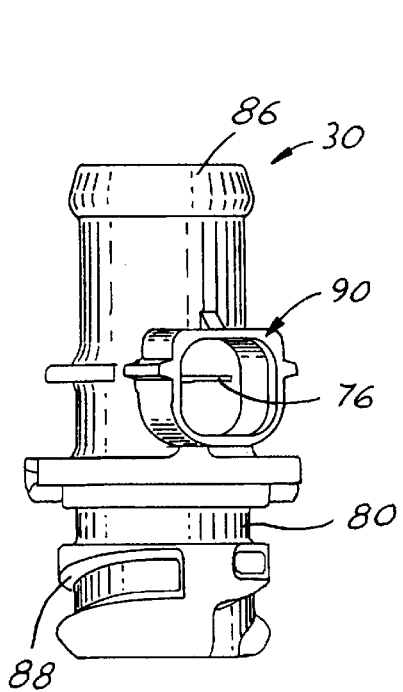
FIG. 2A is a perspective view of a PCV valve according to a preferred embodiment of the invention.
Figure 2B:
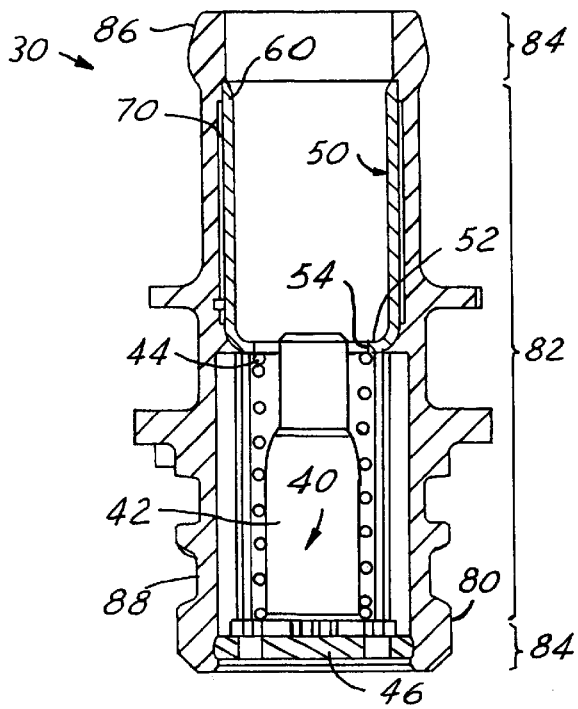
FIG. 2B is a cross-sectional view of the PCV valve shown in FIG. 2A.

Referring now to FIGS. 2A and 2B, there is generally illustrated a heated PCV valve 30 according to a preferred embodiment of the present invention. FIG. 2A is a perspective view of the PCV valve 30, and FIG. 2B is a cross-sectional view of the PCV valve 30.

The heated PCV valve 30 preferably includes a valve body 80 having an intermediate portion 82 and opposing end portions 84. The intermediate portion 84 has a heating element 50 contained therein for heating the crankcase gases passing through the valve 30. Also, the intermediate portion 82 preferably has the plunger and spring assembly 40 contained therein for regulating the flow of crankcase gases through the PCV valve 30. The heating element 50 and the plunger and spring assembly 40 are preferably disposed directly adjacent to each other within the intermediate portion. However, the heating element 50 and the plunger and spring assembly 40 may also be disposed within the same region of the intermediate portion 82 such that the heating element surrounds the plunger and spring assembly 40. Of course, the heating element 50 and the plunger and spring assembly 40 may be otherwise oriented within the valve body 80 as desired.

Figure 3A:
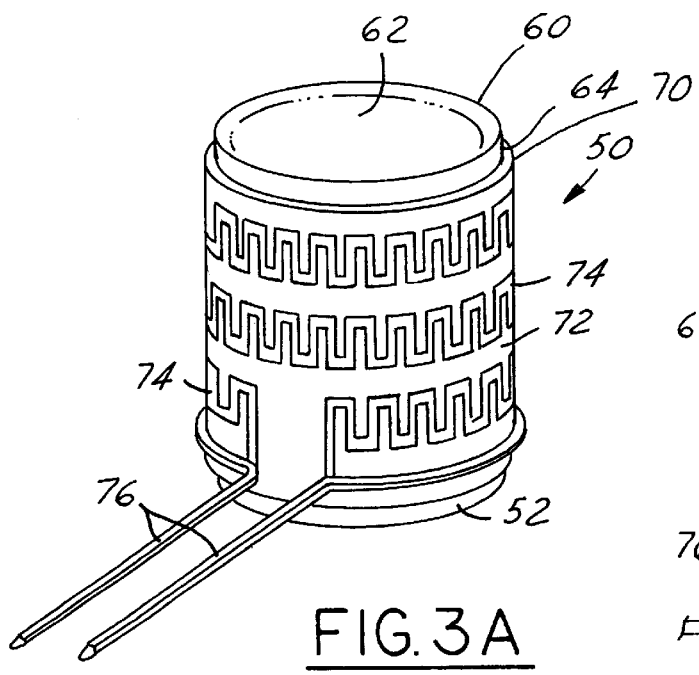
FIG. 3A is a perspective view of a heating element consisting of a heat sink with a resistance heating member coupled thereto, according to a preferred embodiment of the present invention.
Figure 3B:
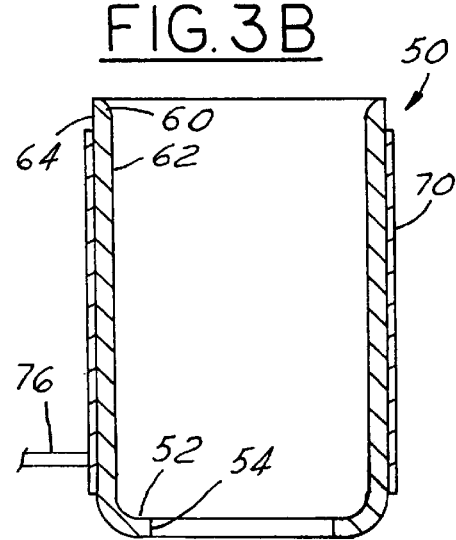
FIG. 3B is a cross-sectional view of a heating element consisting of a heat sink with a resistance heating member coupled thereto, according to a preferred embodiment of the present invention.

As best shown in FIGS. 3A and 3B, the heating element 50 preferably includes a heat sink 60 with a resistance heating member 70 coupled thereto. The heat sink 60 preferably is a thermally conductive metal cup defined by an inner surface 62, an outer surface 64, and a bottom wall 52 having an orifice 54 integrally formed therethrough at its center. Preferably, the inner surface 62 is directly exposed to the flow of crankcase gases, and the outer surface 64 has the resistance heating member 70 attached thereto. Of course, the heat sink 60 may be other suitable mechanisms as desired. Also, the orientation of the heat sink 60 and resistance heating member 70 may be other suitable arrangements.

The resistance heating member 70 preferably includes a substrate 72 with a conductive circuit 74 therein having a positive thermal coefficient (PTC) of electrical resistance. The substrate 72 may be composed of polyester, silicon, or other suitable materials. As the temperature of the circuit 74 increases, the resistance of the circuit 74 increases, as well. Thus, less current flows through the circuit 74 as its temperature increases. In this regard, the PTC heater is self-regulating and generates heat until a maximum threshold temperature is reached. Power is supplied to the PTC heater through two electrical terminals 76 soldered to the circuit 74. Obviously, the resistance heating member 70 may be a FTC heater or other adequate heating devices as desired.

In an alternative embodiment, the heating element 50 may consist of a single heat source, e.g. a PTC heater, without a heat sink attached thereto.

Preferably, a bi-metal thermostat is operatively connected to the electrical terminals 76 and supplies power to the resistance heating member 70 when a minimum temperature threshold is reached. For example, the thermostat may supply power to the resistance heating member 70 when ambient temperature is 0 C. or below.

The PCV valve 30 preferably uses a plunger and spring assembly 40 to meter the flow of crankcase gases through the orifice 54. The plunger and spring assembly 40 includes a plunger 42, a spring 44, and a retainer ring 46. The spring 44 preferably biases the plunger 42 away from the orifice 54. The plunger 42 extends into the orifice 54 to a particular degree so as to obstruct the flow of crankcase gases therethrough. The degree to which the plunger 42 extends into the orifice 54 depends upon the amount of manifold vacuum opposing the force of the spring 44. It is preferred that the plunger 42 increasingly obstruct the flow of crankcase gases through the orifice 54 as the manifold vacuum increases. The retainer ring 46 fastens to the valve body 80 so as to secure the plunger 42 and the spring 44 within the valve body 80. The connection between the retainer ring 46 and the valve body 80 may be accomplished by friction fit, snap-fit, or other suitable attachments.

In an alternative embodiment, the orifice 54 is sized sufficiently small that it only permits an approximately constant flow of gases to pass therethrough. In this regard, the orifice 54 itself regulates the flow of crankcase gases, and the plunger and spring assembly 40 is not required. Typically, the rate of flow increases with the size of the orifice 54. Therefore, the desired rate of flow can be accomplished by sizing the orifice 54 accordingly.

According to the preferred embodiment, the valve body 80 further includes a barb 86 integrated within one end and a cam-lock fastener 88 integrated within an opposing end. The barb 86 serves as a detent for securing a connection between the valve body 80 and the second conduit 26. The cam-lock fastener 88 preferably is a groove formed within the valve body 80 for mating to an opposing fastener (not shown) within the cam cover 24'. However, it is clear that the valve body 80 may include a variety of other suitable fastener mechanisms for attaching to the engine.

The valve body 80 further includes an electrical connection portion 90. The electrical connection portion 90 extends radially outward from a longitudinal axis of the valve body 80 and partially encloses the electrical terminals 76. The electrical terminals 76 extend from the heating element 70 radially outward to connect to a power source.

Figure 4:
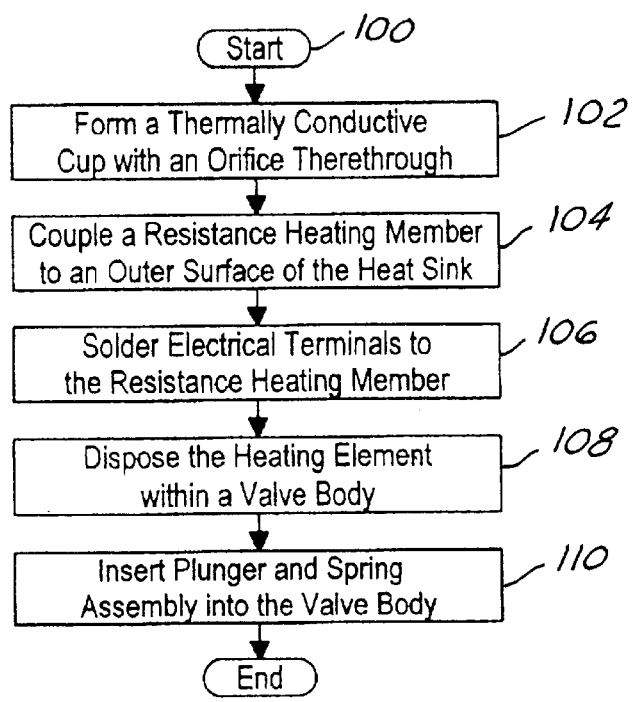
FIG. 4 is a flowchart illustrating a method of manufacturing a PCV valve according to a preferred embodiment of the present invention.

Referring now to FIG. 4, a flowchart illustrates a method of manufacturing a heated PCV valve 30 according to the preferred embodiment of the present invention. The method begins in step 100 and immediately proceeds to step 102.

In step 102, the heat sink 60 is provided by forming a cup with an orifice 54 formed through its bottom. The cup may be formed by stamping a metal blank, machining a metal blank, injection molding a plastic material doped with metal particles, or a variety of other suitable methods. The sequence then proceeds to step 104.

In step 104, a resistance heating member 70 is attached to an outer surface 64 of the heat sink 60. The resistance heating member 70 preferably is a PTC heater as described above or any other suitable heating device. The attachment between the heating member 70 and the heat sink 60 may be accomplished using an epoxy, a pressure sensitive adhesive, or any other desired fastener. The sequence then proceeds to step 106.

In step 106, two terminals 76 are soldered to the resistance heating member 70 for providing power thereto. These terminals 76 preferably are metal pins for serving as a male electrical connector. The metal is sufficiently strong to withstand normal attachment and detachment to a female electrical connector. Then, the sequence proceeds to step 108.

In step 108, the heating element 50, which includes the heat sink 60 and the resistance heating member 70, is disposed within a valve body 80. This step is preferably accomplished by insert molding the heating element 50 within a plastic valve body 80 or alternatively by any other suitable method. The electrical terminals 76 are molded such that they extend outwardly of the valve body 80 allowing connection to a power source. Then, the sequence proceeds to step 110.

In step 110, the plunger and spring assembly 40 is inserted into the valve body. Preferably, the spring 44 is inserted first followed by the plunger 42 and then the retainer ring 46.

In conclusion, while particular embodiments of the invention have been shown and described, numerous variations and alternate embodiments will occur to those skilled in the art. Accordingly, it is intended that the invention be limited only in terms of the appended claims.

What is claimed is:

1. A PCV valve for heating a crankcase gas comprising:
a valve body for metering a flow of the crankcase gas therethrough; and
a heating element integrally disposed within said valve body for heating the crankcase gas, said heating element located in an intermediate portion of said valve body.

2. The PCV valve as recited in claim 1 wherein said heating element comprises a heat sink with a resistance heating member coupled thereto.

3. The PCV valve as recited in claim 2 wherein said heat sink has an orifice integrally formed therethrough for receiving a plunger and metering said flow therethrough.

4. The PCV valve as recited in claim 2 wherein said heat sink has an orifice integrally formed therethrough, said orifice being sized for allowing an approximately constant flow therethrough at a desired rate.

5. The PCV valve as recited in claim 2 wherein said resistance heating member has at least two electrical terminals for receiving an electrical current.

6. The PCV valve as recited in claim 2 wherein said resistance heating member comprises a PTC heater.

7. The PCV valve as recited in claim 1 wherein said heating element has a thermal switch connected thereto for passively connecting and passively disconnecting said heating element to a power source.

8. A method for manufacturing a heated PCV valve comprising:

providing a heating element as recited in claim 2; and disposing said heating element within an intermediate portion of a valve body.

9. The method as recited in claim 8 wherein the step of providing a heating element comprises:

forming a thermally conductive cup with an orifice therein;

attaching a resistance heating member to said thermally conductive cup;

soldering at least two terminals to said resistance heating member.

10. The method as recited in claim 9 wherein the step of forming said thermally conductive cup comprises at least one of:

stamping a metal blank;

machining said metal blank; and injection molding a plastic material doped with a plurality of metal particles.

11. The method as recited in claim 9 wherein the step of attaching a resistance heating member to said thermally conductive cup comprises employing at least one of an epoxy and a pressure sensitive adhesive.

12. The method as recited in claim 8 wherein the step of disposing said heating element within said intermediate portion of said valve body comprises insert molding said heating element into said valve body.

13. The method as recited in claim 8 further comprising the step of:

inserting a plunger and spring assembly into said valve body.

14. The method as recited in claim 13 wherein the step of inserting said plunger and spring assembly comprises:

inserting a spring into said valve body;

inserting a plunger into said valve body; and inserting a retainer ring into said valve body.

15. A PCV system for heating a crankcase gas accumulating within an internal combustion engine, the PCV system comprising:

a valve body for metering a flow of the crankcase gas therethrough, said valve body coupled to a crankcase gas chamber of the engine; and a heating element integrally disposed within said valve body for heating the crankcase gas;

an intake manifold having an intake orifice, said intake orifice and said valve body having an operative connection therebetween for permitting said flow of the crankcase gas.

16. The PCV system as recited in claim 15 wherein said heating element comprises a heat sink with a resistance heating member coupled thereto.

17. The PCV system as recited in claim 16 wherein said heat sink has an orifice integrally formed therethrough for receiving a plunger and metering said flow therethrough.

18. The PCV system as recited in claim 16 wherein said heat sink has an orifice integrally formed therethrough, said orifice being sized for allowing an approximately constant flow therethrough at a desired rate.

19. The PCV system as recited in claim 16 wherein said resistance heating member comprises a PTC heater.

20. The PCV system as recited in claim 16 wherein said heating element has a thermal switch connected thereto for passively connecting and passively disconnecting said heating element to a power source.

* * * * *